United States Patent
Thiagarajan

(10) Patent No.: US 7,240,083 B1
(45) Date of Patent: Jul. 3, 2007

(54) PRECISION COMPLEX SINUSOID GENERATION USING LIMITED PROCESSING

(76) Inventor: Ganesan Thiagarajan, 1235 Wildwood Ave. #372, Sunnyvale, CA (US) 94089

( * ) Notice: Subject to any disclaimer, the term of this patent is extended or adjusted under 35 U.S.C. 154(b) by 685 days.

(21) Appl. No.: 09/966,103

(22) Filed: Oct. 1, 2001

(51) Int. Cl.
*G06F 1/02* (2006.01)
(52) U.S. Cl. .................................... 708/276
(58) Field of Classification Search ............. 708/270, 708/276
See application file for complete search history.

(56) References Cited

U.S. PATENT DOCUMENTS

| | | | |
|---|---|---|---|
| 3,633,017 A | 1/1972 | Crooke et al. | |
| 3,674,998 A * | 7/1972 | Benz | 702/77 |
| 4,577,287 A | 3/1986 | Chrin | |
| 4,878,187 A | 10/1989 | Buneman | |
| 5,068,816 A | 11/1991 | Noetzel | |
| 5,530,720 A | 6/1996 | Marguinaud | |
| 5,699,383 A * | 12/1997 | Ichiyoshi | 375/297 |
| 5,732,107 A | 3/1998 | Phillips et al. | |
| 5,865,751 A * | 2/1999 | Okuno et al. | 600/443 |
| 6,311,046 B1 | 10/2001 | Dent | |
| 6,385,632 B1 | 5/2002 | Choe et al. | |
| 6,426,977 B1 | 7/2002 | Lee et al. | |
| 6,483,459 B1 | 11/2002 | Hou et al. | |
| 6,640,237 B1 | 10/2003 | Genrich | |

* cited by examiner

*Primary Examiner*—Tan V. Mai
(74) *Attorney, Agent, or Firm*—Berkeley Law & Technology Group

(57) ABSTRACT

A first phasor associated with an electronic signal and a delta phasor associated with a cyclic rate of the electronic signal are multiplied to produce a second phasor. To compensate for any deviation in the magnitude of the second phasor, a real and imaginary correction factor are determined and added to the second phasor. The imaginary and real correction factors can be determined by first calculating the sum and difference of the real and imaginary portions of the first phasor respectively. The sum and difference are then scaled by performing simple shift-operations to produce the real and imaginary correction factors. The corrected second phasor is then used to update the electronic signal, which in turn can be used to produce another signal, such as a communication signal.

65 Claims, 8 Drawing Sheets

| Angle | Cosine | Sine |
|---|---|---|
| -2/128 | 0.995185 | -0.146730 |
| -1/128 | 0.998795 | -0.049068 |
| 0 | 1.0 | 0.0 |
| 1/128 | 0.998795 | 0.049068 |
| 2/128 | 0.995185 | 0.098017 |
| 3/128 | 0.989177 | 0.146730 |
| ... | ... | ... |
| ... | ... | ... |
| 14/128 | 0.707107 | 0.634393 |
| 15/128 | 0.773011 | 0.671559 |
| 1/8 | 0.707107 | 0.707107 |
| 17/128 | 0.671559 | 0.740950 |
| 18/128 | 0.634393 | 0.773011 |

$\frac{\pi}{4}$ (0.125)

0.0

682

$\frac{\pi}{2}$ (0.25)

$-\frac{\pi}{2}$ (-0.25)

| Angle | Sine |
|---|---|
| $x_n$ | $Y_n$ |
| -2/128 | -0.146730 |
| -1/128 | -0.049068 |
| 0 | 0.0 |
| 1/128 | 0.049068 |
| 2/128 | 0.098017 |
| 3/128 | 0.146730 |
| ... | ... |
| ... | ... |
| 14/128 | 0.634393 |
| 15/128 | 0.671559 |
| 1/8 | 0.707107 |
| 17/128 | 0.740951 |
| 18/128 | 0.773011 |

Arrows: $\delta'_0$, $\delta'_1$, $\delta'_2$, $\delta'_3$ (694)

Fig. 6

| Angle | Cosine |
|---|---|
| $x_n$ | $Y_n$ |
| -2/128 | 0.995185 |
| -1/128 | 0.998795 |
| 0 | 1.0 |
| 1/128 | 0.998795 |
| 2/128 | 0.995185 |
| 3/128 | 0.989177 |
| ... | ... |
| ... | ... |
| 14/128 | 0.773011 |
| 15/128 | 0.740951 |
| 1/8 | 0.707107 |
| 17/128 | 0.671559 |
| 18/128 | 0.634393 |

Arrows: $\delta_0$, $\delta_1$, $\delta_2$, $\delta_3$ (692)

PRECISION COMPLEX SINUSOID GENERATION USING LIMITED PROCESSING

BACKGROUND OF THE INVENTION

1. Field of Invention

This invention relates to methods and systems for generating sinusoidal signals having application in data communication systems and other environments.

2. Description of Related Art

As successive generations of wireless communication systems are deployed around the world, the importance of providing clear and cost-effective communication services increases. Generally, the clarity of wireless communication systems is dependent on using precision components, such as low-distortion complex sinusoid oscillators. Although a number of low-distortion sinusoid oscillators are available, these low-distortion oscillators can be prohibitively expensive.

Available less expensive sinusoid oscillators may not produce complex sinusoids having the requisite distortion, precision and stability. For example, as successive points of a complex sinusoid are generated, the magnitude of the complex sinusoid can deteriorate towards zero. As a result, such oscillators are generally useful only for a short duration and cannot be used for various purposes, such as generating or decoding continuous streams of modulated data.

Another problem with these less expensive sinusoid oscillators is that any communication signal generated with them may be excessively distorted. Similarly, any receiver using such sinusoid oscillators may contaminate a received signal such that the receiver will not reliably extract any information contained in the communication signal. Accordingly, there is a need for methods and systems that can provide precision complex sinusoids using an economy of electronic hardware.

SUMMARY OF THE INVENTION

In various embodiments, a first phasor associated with an electronic signal and a delta phasor associated with a cyclic rate of the electronic signal are multiplied to produce a second phasor. To compensate for any deviation in the magnitude of the second phasor, a real and imaginary correction factor are determined and added to the second phasor. The imaginary and real correction factors can be determined by first calculating the sum and difference of the real and imaginary portions of the first phasor respectively. The sum and difference are then scaled by performing simple shift-operations to produce the real and imaginary correction factors. The corrected second phasor is then used to update the electronic signal, which in turn can be used to produce another signal, such as a communication signal. Others features and advantages will become apparent from the following figures and descriptions of various embodiments.

DESCRIPTION OF THE DRAWINGS

The invention is described in detail with regard to the following figures, wherein like numerals reference like elements, and wherein:

FIG. 5 depicts an exemplary data-value table according to the present invention;

FIG. 6 depicts a cosine portion of the data-value table of FIG. 5 with a number of respective inverse-denominator values;

FIG. 7 depicts a sine portion of the data-value table of FIG. 5 with a number of respective inverse-denominator values;

DETAILED DESCRIPTION OF PREFERRED EMBODIMENTS

Figure 1:
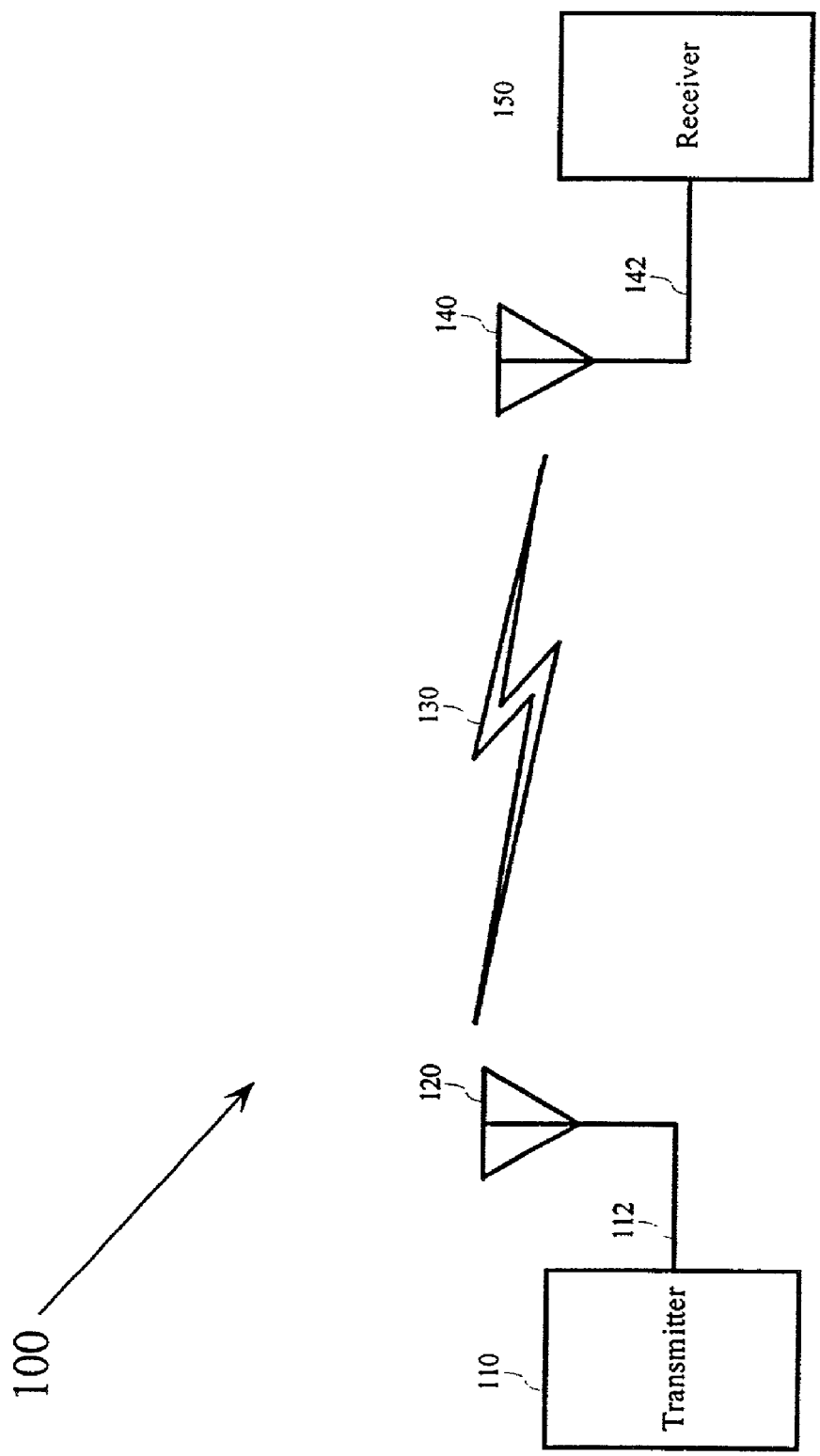
FIG. 1 is a block diagram of an exemplary communication system with which the invention may be implemented.

FIG. 1 is a block diagram of an exemplary communication system 100 that includes a transmitter 110 with a transmit antenna 120, a transmission path 130 and a receiver 150 with a receive antenna 140. In operation, the transmitter 110 can provide a communication signal that contains digital symbol information to the transmit antenna 120 via link 112. The transmit antenna 120 can receive the transmitter's signal and effectively convey the energy of the transmitter signal in the form of a wireless communication signal, which can then be received by various devices.

As the wireless communication signal propagates along path 130, the signal can be picked up by the receive antenna 140 and conveyed to the receiver 150 via link 142. Once the receiver 150 has received the wireless communication signal, the receiver 150 can extract the symbol information from the received signal and provide the extracted symbol information to an external device (not shown).

The exemplary transmitter 110 can be a wireless transmitter transmitting radio-frequency signals. However, in various embodiments, it should be appreciated that the transmitter 110 can be any one of a number of different transmission sources, such as in addition to a wireless RF transmitter, a transmission system employing wires, such as a twisted wire pair, a transmitter adapted for transmitting across a coaxial cable, an optical transmitter, a transmitter configured to transmit across a network, such as a telephone network or the Internet, a sonic transmitter or any other known or later developed device suitable for transmitting information.

Accordingly, the exemplary receiver 150 can be a wireless radio receiver. However, it should be appreciated that the receiver 150 can alternatively be any one of a number of different receiving devices, such as a wireless receiver, a reception system employing wires, such as a twisted wire pair, a receiver adapted to receive signals from a coaxial cable, a receiver adapted to receive signals from a network, an optical receiver, a fiber optic receiver, a sonic receiver or any other known or later developed device suitable for receiving information.

As the forms of the transmitter 110 and receiver 150 vary, it should be appreciated that the form of the transmission path 130 can vary accordingly. That is, in various embodiments, the transmission path 130 can be a wireless link, a wired link, such as a 10baseT, 100baseT or Ethernet-based link, a link over an intranet, a link over an extranet, a link over the Internet, a link over a telephony-based network, an optical link, a sonic link or any other known or later developed combination of systems, conduits and devices capable of conveying information from a first location to a second location.

Figure 2:
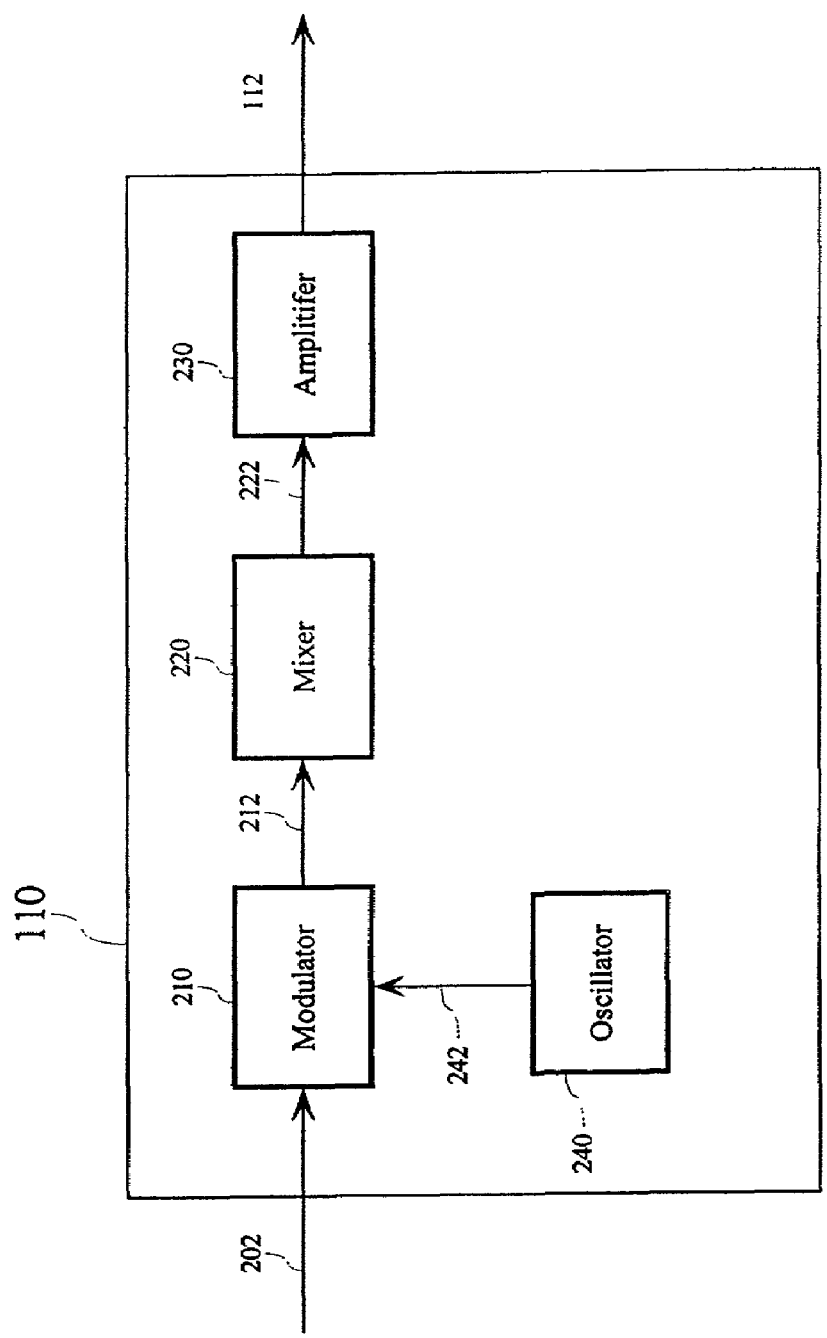
FIG. 2 is a block diagram of the exemplary transmitter of FIG. 1.

FIG. 2 is a block diagram of the exemplary transmitter 10 of FIG. 1. As shown in FIG. 2, the exemplary transmitter 110 includes a modulator 210, a mixer 220, an amplifier 230 and an oscillator 240 functional interconnected as shown. In operation, the modulator 210 can receive information from an external source (not shown) via link 202. The modulator 210 can further receive a complex sinusoid from the oscillator 240 via link 242 and encode/modulate the received information.

After the received information has been encoded/modulated, the modulator 210 can pass the modulated signal to the mixer 220 via link 212. It should be appreciated that the modulator 210 can use any known or later developed modulation technique capable of encoding information into a stream of symbols.

The mixer 220 can receive the modulated signal and frequency-shift the modulated signal to a radio-frequency band. For example, the mixer 220 can receive a base-band signal having a particular bandwidth and shift each frequency component of the base-band signal about a center frequency of ten megahertz. Once the mixer 220 has frequency-shifted the modulated signal, the mixer 220 can provide the frequency-shifted signal to the amplifier 230 via link 222.

The amplifier 230 can receive the frequency-shifted signal, amplify and condition the frequency-shifted signal and provide the amplified/conditioned signal to an external device, such as an antenna, via link 112.

Figure 3:
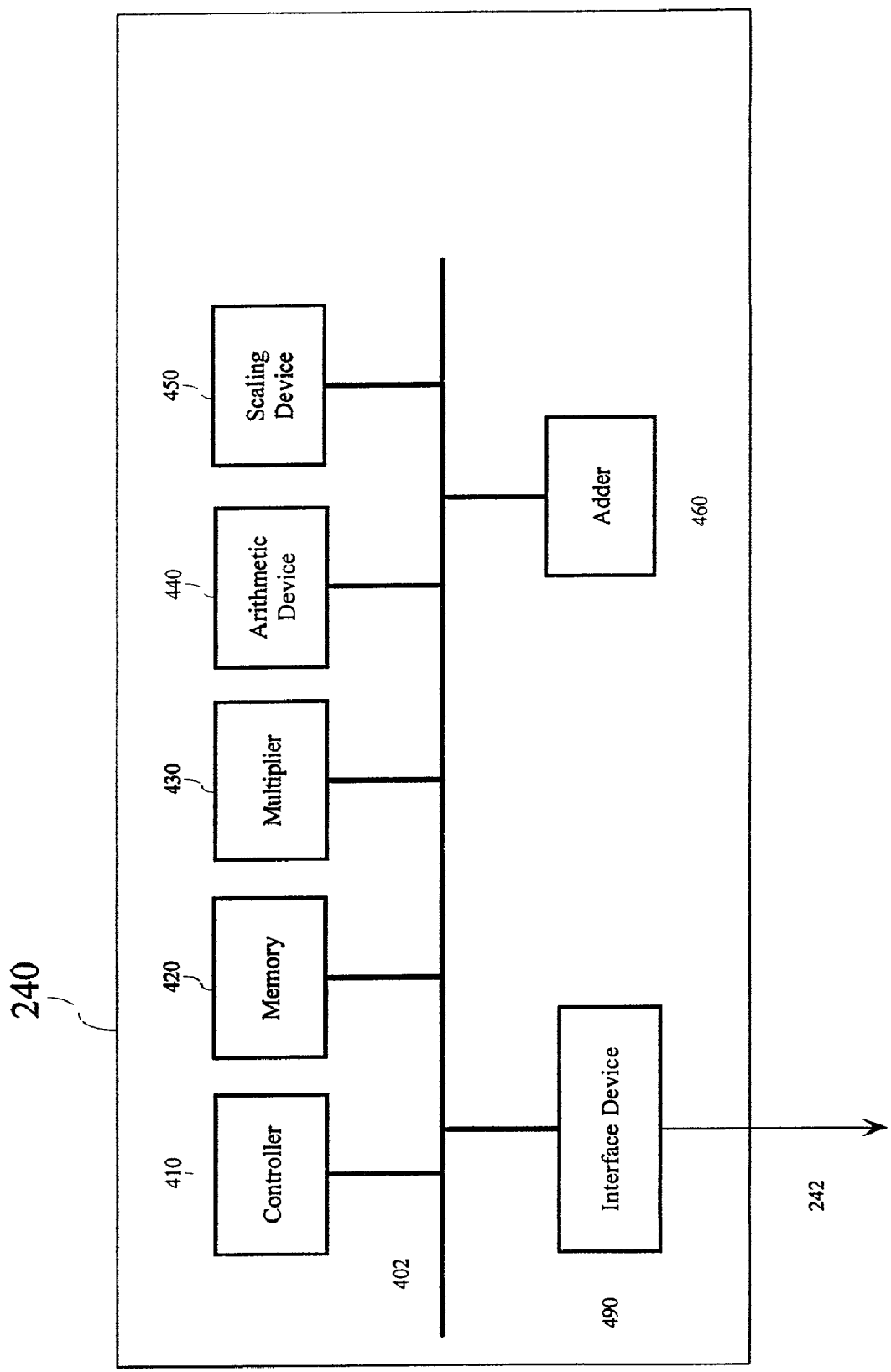
FIG. 3 is a block diagram of the exemplary oscillator of FIG. 2.

FIG. 3 is a block diagram of the exemplary oscillator 240 of FIG. 2. As shown in FIG. 3, the oscillator 240 contains a controller 410, a memory 420, a multiplier 430, an arithmetic device 440, a scaling device 450, an adder 460 and an interface 490 coupled together through a control/data bus 402. While the exemplary oscillator 240 uses a bussed structure, it should be appreciated that the oscillator 240 can be implemented using any number of architectures, such as an architecture based on fixed electronic circuits, programmable logic and the like without departing from the spirit and scope of the present invention.

In operation, the oscillator 240 can generate a complex sinusoid s[n] according to Eq. (1) below:

$$s[n]=e^{j\omega n}=e^{j\omega(n-1)} * e^{j\omega} \quad (1)$$

where $e^{j\omega(n-1)}$ is a first phasor and $e^{j\omega}$ is a delta phasor. That is, $e^{j\omega(n-1)}$ is a particular representation of a complex sinusoid having a real portion, i.e., $\cos(\omega(n-1))$, and an imaginary portion, i.e., $\sin(\omega(n-1))$, and further having a magnitude of $\cos^2(\omega(n-1))+\sin^2(\omega(n-1))=1.0$. Similarly, the delta phasor $e^{j\omega}$ can be a complex number having a real portion, i.e., $\cos(\omega)$, an imaginary portion, i.e., $\sin(\omega)$, and unit magnitude.

The exemplary first phasor can be initially determined by any number of techniques or simply assigned a predetermined value, such as 1.0, and stored in the memory 420. Similarly, the exemplary delta phasor can be determined using any number of techniques and stored in the memory 420.

During operation, the controller 410 can take the first phasor and the delta phasor and provide the first phasor and delta phasor to the multiplier 430. The multiplier 430 can then perform a complex multiplication on the first and delta phasors to produce a second phasor, i.e., $e^{j\omega n}$.

Next, the controller 410 can provide the first phasor to the arithmetic device 440. The arithmetic device 440 can receive the first phasor, subtract the imaginary portion of the first phasor from the real portion of the first phasor to produce a first difference, and further add the real and imaginary portions of the first phasor to produce a first sum. Next, the arithmetic device 440 can provide the first sum and difference to the scaling device 450.

The scaling device 450 can receive the first sum and difference and scale the first sum and difference to produce a real correction factor δR and imaginary correction factor δI according to Eqs. (2) and (3) below:

$$\delta R=[\cos(\omega(n-1))-\sin(\omega(n-1))]\alpha 2^{-N} \quad (2)$$

$$\delta I=[\cos(\omega(n-1))+\sin(\omega(n-1))]\alpha 2^{-N} \quad (3)$$

where $[\cos(\omega(n-1))-\sin(\omega(n-1))]$ is the first difference, $[\cos(\omega(n-1))+\sin(\omega(n-1))]$ is the first sum, α is a predetermined scaling factor and N is the targeted/expected bit-precision of a particular oscillator.

In various embodiments, the scaling factor α of Eqs. (2) and (3) can be approximated according to Eq. (4) below:

$$\alpha = \left( \frac{1.0 - (\cos^2(\omega) + \sin^2(\omega))}{2} \right) \quad (4)$$

where the scaling factor α of Eq. (4) is based on the first term of the Taylor series for square roots.

In various embodiments, the scaling device 450 can employ a multiplier to implement the scaling factor α in Eqs. (3) and (4). However, by approximating α according to Eq. (5)

$$\alpha \approx 2^{-P}, \quad (5)$$

where P is a non-zero integer set such that P satisfies Eq. (6) below $$2^{-P} \approx \left( \frac{1.0 - (\cos^2(\omega) + \sin^2(\omega))}{2} \right), \quad (6)$$

then Eqs. (2) and (3) can be approximated by Eqs. (7) and (8) below:

$$\delta R=[\cos(\omega(n-1))-\sin(\omega(n-1))]2^{-(N+P)}, \text{ and} \quad (7)$$

$$\delta I=[\cos(\omega(n-1))+\sin(\omega(n-1))]2^{-(N+P)}. \quad (8)$$

Because Eqs. (7) and (8) use a scaling factor that is an inverse integer power of 2, i.e., $2^{-(N+P)}$, it should be appreciated that the scaling device 450 can forgo a multiplier and use a simple shifting-device instead. That is, the scaling device 450 of FIG. 3 can receive the first sum and difference and subsequently shift the first sum and difference by (N+P) bits to produce the real and imaginary correction factors δR and δI. The scaling device 450 can then provide the correction factors to the adder 460.

The adder 460 can receive the correction factors 5R and 8I and further receive the second phasor $e^{j\omega n}$. The adder 460 can then add the real correction factor to the real portion of the second phasor and add the imaginary correction factor to the imaginary portion of the second phasor to correct for magnitude errors of the second phasor to form a corrected phasor according to Eq. (9) below:

$$e^{j\omega n}=e^{j\omega(n-1)}*e^{j\omega}+(\delta R+j\delta I) \quad (9)$$

The adder 460 can then provide the corrected second phasor to an external device, such as a modulator, using the interface 490 and link 242.

The exemplary interface 490 is a digital-to-analog converter capable of providing an analog electronic signal to an external device, such as a modulator or demodulator. However, in various embodiments, it should be appreciated that the interface 490 can be any known or later developed device capable of converting a digital signal to any of various forms such as a digital electronic signal, an analog electronic signal, an optical signal, a sonic signal and the like without departing from the spirit and scope of the present invention.

While the exemplary oscillator 240 can provide a stable and accurate complex sinusoid as compared to other devices using inexpensive approaches, it should be appreciated that the oscillator's performance can benefit if the oscillator 240 occasionally opted from using the procedures outlined in Eqs. (1)–(9) in favor of using a high-accuracy technique. That is, the oscillator 240 may, in various embodiments, periodically or systematically provide a highly accurate phasor generally characterized by more expensive oscillators.

When dispersed among phasors generated based on the procedures outlined in Eqs. (1)–(9), a number of highly accurate phasors can assure that the oscillator 240 can generate a lower-distortion and higher-stability complex sinusoid. Accordingly, in various embodiments, it should be appreciated that the oscillator 240 can occasionally calculate a highly accurate phasor using any number of known or later developed techniques directed to complex sinusoid generation.

However, in other embodiments, it should be appreciated that a phasor can periodically pass through various key points, e.g., $\omega$=0, 0.5$\pi$, $\pi$, 1.5$\pi$ and 2$\pi$. Upon reaching such key points, a phasor can take the values s[n]=±1 or s[n]=±j. Assuming that the oscillator 240 can track the samples n relating to such key points, highly accurate phasors may be generated with a minimal investment of processing hardware and/or software.

In still other embodiments, it should be appreciated that the key points of a phasor can be values other than $\omega$=0, 0.5$\pi$, $\pi$, 1.5$\pi$ and 2$\pi$. For example, if it can be determined that a phasor will take the value s[n]=a+jb every five hundredth sample, then the oscillator 240 can simply assign s[n]=a+jb every five hundred cycles and operate according to the techniques of Eqs. (1)–(9) during the remaining cycles.

Figure 4:
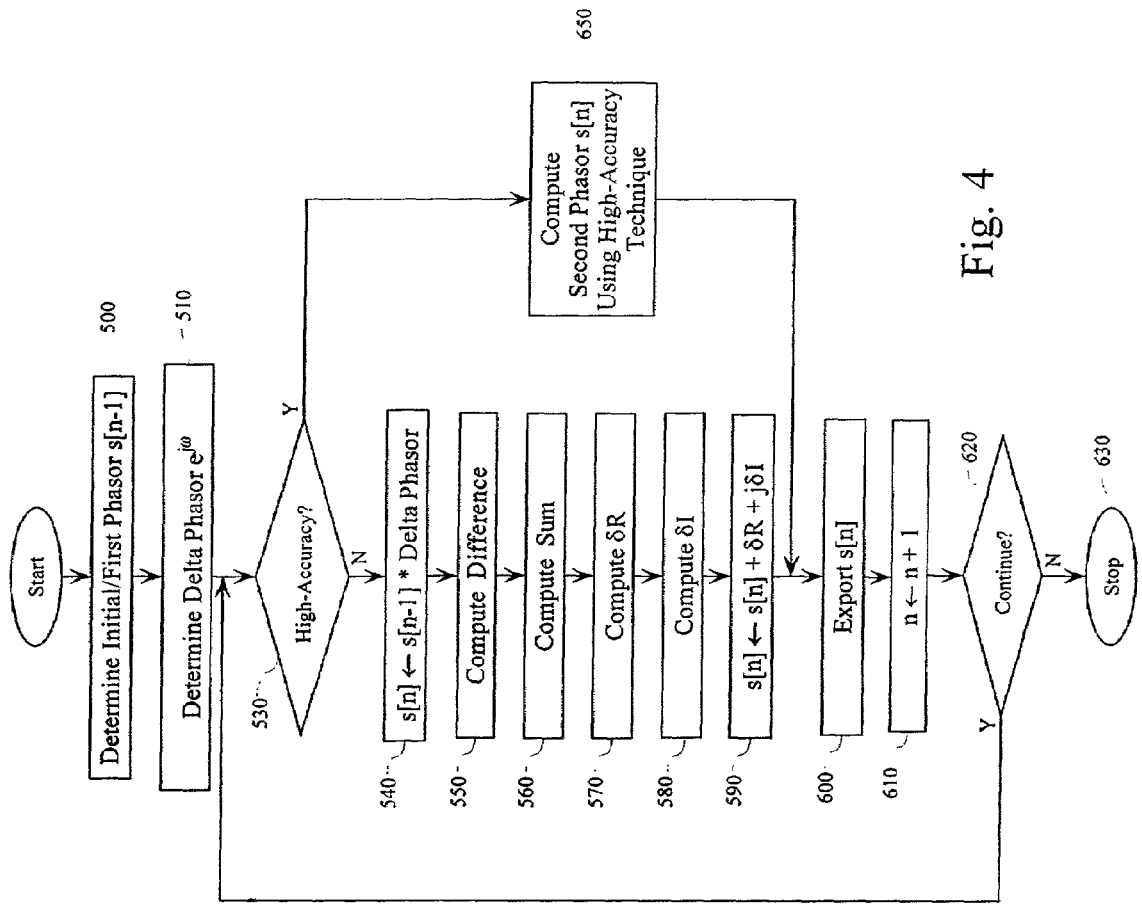
FIG. 4 is a flowchart outlining an exemplary operation for generating a complex sinusoid according to the present invention.

FIG. 4 is a flowchart outlining an exemplary operation for generating complex sinusoids. The operation starts in step 500 where a first phasor is determined. As discussed above, a first/initial phasor can be generated according to any known or later developed technique or simply assigned a particular value, such as 1.0. Next, in step 510, a delta phasor is determined. As with the first phasor, the delta phasor can be generated according to any known or later developed technique or assigned a particular value. Control continues to step 530.

In step 530, a determination is made as to whether to implement a high-accuracy technique, as opposed to the techniques outline in Eqs. (1)–(9) above. If a high-accuracy technique is to be used, control jumps to step 650; otherwise, control continues to step 540.

In step 650, a second phasor s[n] can be generated according to any known or later technique useful to generate phasors having a high magnitude and/or phase accuracy. Alternatively, the second phasor can be generated by assigning the second phasor with phasor values associated with key points. Control continues to step 600.

Otherwise, in step 540, the first phasor and delta phasor are multiplied to produce a second phasor. Next, in step 550, the imaginary portion of the first phasor is subtracted from the real portion of the first phasor to produce a first difference. Then, in step 560, the imaginary portion of the first phasor is added to the real portion of the first phasor to produce a first sum. Control continues to step 570.

In step 570, the first difference is scaled to produce a real correction factor. As discussed above, the first difference can be scaled according to Eqs. (3)–(9) above and, in various exemplary embodiments, the first difference can be scaled using a shifting operation of N+P bits, as opposed to using a multiply operation. Next, in step 580, the first sum is scaled to produce an imaginary correction factor. As with the first difference, the first sum can be scaled according to Eqs. (3)–(9) above and, in various exemplary embodiments, the first sum can be scaled using a shifting operation of N+P bits. Control continues to step 590.

In step 590, the real and imaginary correction factors are added to the real and imaginary portions of the second phasor to correct for the magnitude error of the second phasor. Control continues to step 600.

In step 600, the corrected/second phasor is exported to a device, such as a modulator. Next, in step 610, the time index is updated. That is, first phasor is assigned the value of the corrected/second phasor. Then, in step 620, a determination is made whether to continue to generate the complex sinusoid. If the complex sinusoid is to be further generated, control jumps back to step 530; otherwise, control continues to step 630 where the process stops.

As discussed above, it can be advantageous to generate highly accurate sinusoids either alone or in conjunction with the technique outlined in Eqs. (1)–(9). One standard/conventional technique for generating sine and cosine functions would be to use a Taylor series approximation terminated past the desired number of terms required for a given bit-accuracy. Unfortunately, an excessive number of high-order polynomial terms can be required to attain the designated bit-accuracy. Furthermore, when using finite precision electronic hardware, the coefficients of higher-order terms may be so small as to not help to contribute to the required bit-accuracy, thus limiting accuracy.

Another standard/conventional technique involves generating a Taylor series approximation about a number of reference angles, then using trigonometric identities to compute the desired result. While this technique is computationally efficient, unfortunately, it can be excessively cumbersome due to various intrinsic angle operations.

However, by adopting a Lagrange interpolation approach using a pre-computed/stored tables of sine and cosine data-values about a unit-circle, a highly accurate sinusoid (or complex sinusoid) can be generated in a straightforward process using relatively low-order polynomials. Furthermore by specifying that the sine and cosine data-values be equally-spaced about the unit-circle, much of the processing required for any given phasor can be greatly simplified and pre-computed such that pre-computed portions of the Lagrange interpolation approach can be stored and later repetitively extracted for subsequent use. Accordingly, as various phasors are generated using such a carefully modified Lagrange approach, the required processing can be greatly reduced.

Generally, a Lagrange interpolation approach can take the form of Eq. (10) below:

$$y(x) = \sum_{n=0}^{N} b_n(x) y_n, \; b_n(x) = \prod_{m=0, m \neq n}^{N} \left( \frac{(x - x_n)}{(x_n - x_m)} \right), \quad (10)$$

where N is the desired order of the Lagrange interpolation, $x_n$ are the domain-values for a set of data points $[x_n, y_n]$ describing a function, such as a sine or cosine function, $y_n$ are range-values corresponding to each domain-value and x is a domain-variable angle/value along the domain of the function. Equation (10) above can be expressed in an expanded form of Eq. (11) below:

$$y(x) = \left( \frac{(x - x_1)(x - x_2) \ldots (x - x_N)}{(x_0 - x_1)(x_0 - x_2) \ldots (x_0 - x_N)} \right) y_0 +$$
$$\left( \frac{(x - x_0)(x - x_2) \ldots (x - x_N)}{(x_1 - x_0)(x_1 - x_2) \ldots (x_1 - x_N)} \right) y_1 + \ldots \quad (11)$$

Because the domain-values $\{x_0 \ldots x_n\}$ are known and non-variable values, it should be appreciated that any denominator-value using only these known and non-variable values can be pre-computed. Accordingly, denominator-values need be computed once and stored such that each subsequent Lagrange interpolation of any point about a function can take advantage of the pre-computed denominators, thus improving computational efficiency. That is, Eq. (10) above can be reduced to Eq. (12) below:

$$y(x) = \sum_{n=0}^{N} c_n \, d_n(x) \, y_n, \; d_n(x) = \prod_{m=0, m \neq n}^{N} (x - x_n), \quad (12)$$

where each $c_n$ is an inverse-denominator value that can pre-computed according to Eq. (13) below:

$$c_n = \prod_{m=0, m \neq n}^{N} \frac{1}{(x_n - x_m)}. \quad (13)$$

Observing Eq. (13), it should be appreciated that, by choosing data-values $\{x_0 \ldots x_n\}$ such that $|x_k - x_{k+1}|$=constant, i.e., the data-values are equally-spaced, Eq. (13) can be reduced to Eq. (14) below:

$$c_n = \prod_{m=0, m \neq n}^{N} \frac{1}{(\delta_m)} = c_{constant}. \quad (14)$$

Accordingly, for each domain-value x, each of the denominator-derived values $c_n$ can take a common constant value $c_{constant}$ and thus processing can be further simplified.

In the present embodiment, assuming that the data-values of a pre-computed table describing a sine/cosine (or other) function are equally-spaced, it can be shown that an angular-spacing of $\pi/64$ (128th of a sinusoidal cycle) about the unit-circle can suffice to produce a 24-bit accurate sine or cosine function for a third-order Lagrange polynomial. Accordingly, two tables of 128 data-values each can suffice to generate 24-bit accurate phasors for sine and cosine functions.

However, given that various waveforms, such as sine and cosine functions, are highly symmetric, it should be appreciated that sine/cosine information about $2\pi$ radians (one cycle) can be expressed using a table containing sine or cosine data points about a single $\pi/2$ radian arc (one-quarter cycle) or alternatively, expressed using two separate tables for both sine and cosine functions about a $\pi/4$ radian arc (one-eighth cycle).

FIG. 5 depicts a data-value table 690 residing in a portion of memory 420 as well as a graphical representation 680 about a unit-circle of the data-values in the data-value table 690. As shown in FIG. 5, the data-value table 690 can contain sine/cosine data-values over an arc of the unit-circle, such as arc 682 depicted on the unit-circle 680, which ranges from 0 to ⅛ cycles. Also shown in FIG. 5, besides containing sixteen sine/cosine data-values ranging from 0 to ⅛ cycles, the data-value table 690 can include two extra values on each end of the arc-range (for a total of twenty data-values for each sine and cosine function) such that a polynomial interpolation of sufficiently low-order, e.g., order three, can interpolate near the data end-values.

While the exemplary data-value table 690 and Lagrange technique can use domain/angular-values expressed in cycles, radians, gradients and degrees, it should be appreciated that using angles expressed in cycles can simplify computation, maintain input precision and allow for inputs specified directly for normalized frequency units.

Still further, although the exemplary data-value table 690 is configured to use a cubic Lagrange technique, i.e., N=3, it should be appreciated that the particular Lagrange order along with the particular configuration of the data-value table 690 can vary without departing from the spirit and scope of the present invention. However, it has been determined by experimentation that an order of N=3 is sufficient to achieve 24-bit accuracy. Although a larger-order operation may also achieve sufficient accuracy, it should be appreciated that as the order increases, computational complexity increases as well.

FIGS. 6 and 7 depict cosine and sine table portions 692 and 694 of the data-value table 690 of FIG. 5 paired with respective sets of denominator-values $[\delta_0, \ldots \delta_3]$ and $[\delta'_0, \ldots \delta'_3]$. The exemplary sets of denominator-values $[\delta_0, \ldots \delta_3]$ and $[\delta'_0 \ldots \delta'_3]$ are centered around points $x_n$ and $y_n$ and are the product terms of Eqs. (13)–(14) above. As earlier discussed, computational efficiency can be greatly increased by pre-computing inverse-denominator-values $c_n$ and $c'_n$ according to Eq. (14) using $[\delta_0, \ldots \delta_3]$ and $[\delta'_0, \ldots \delta'_3]$ and storing them in a memory for later retrieval. Also as earlier discussed, assuming that the domain-values of tables 522–524 are equally-spaced, processing can be further simplified as $c'_n = c_n$=constant for all n=0, . . . N.

Returning to FIG. 3, to produce a high-accuracy phasor, the controller 410 can provide a given angular-value, i.e., a domain-value, x to the arithmetic device 440. The controller 410 can further provide N+1 number of pre-stored values $[x_n, y_n]$ describing a portion of either/both a sine and cosine function from the memory 420 to the multiplier 430 and arithmetic device 440.

The arithmetic device 440 can receive the domain-value x and pre-stored values $[x_n, y_n]$, calculate the various difference-values $(x-x_n)$ of Eq. (12) using the points $[x_n, y_n]$ surrounding x, and pass the calculated difference-values to the multiplier 430.

The multiplier 430 can receive the calculated difference-values $(x-x_n)$, further receive the respective range-values $y_n$ and inverse-denominator-values $c_n$, (which can be retrieved from memory 420) and calculate the product-values $(d_n(x) \times y_n \times c_n)$ of Eq. (12) for each value n=0 ... N. The multiplier 430 can then pass the calculated product-values $(d_n(x) \times y_n \times c_n)$ to the arithmetic device 440, which in turn can add the various calculated product-values to provide the resulting sum y(x) according to Eq. (12).

Assuming that the multiplier 430 and arithmetic device 440 operate to determine both the sine and cosine values for a given angle x, a complex phasor=(cos(x)+j(sin(x))) can be constructed. The complex phasor can then be used to generate subsequent complex phasors according to Eqs. (1)–(9) above, according to FIGS. 1–4 above or used for any other task requiring a simple or complex phasor.

As the multiplier 430 and arithmetic device 440 generate any number of values of a sinusoid, the controller 410 can export the values to an external device, such as a modulator, demodulator or frequency-shifting device via the interface 490.

Figure 8:
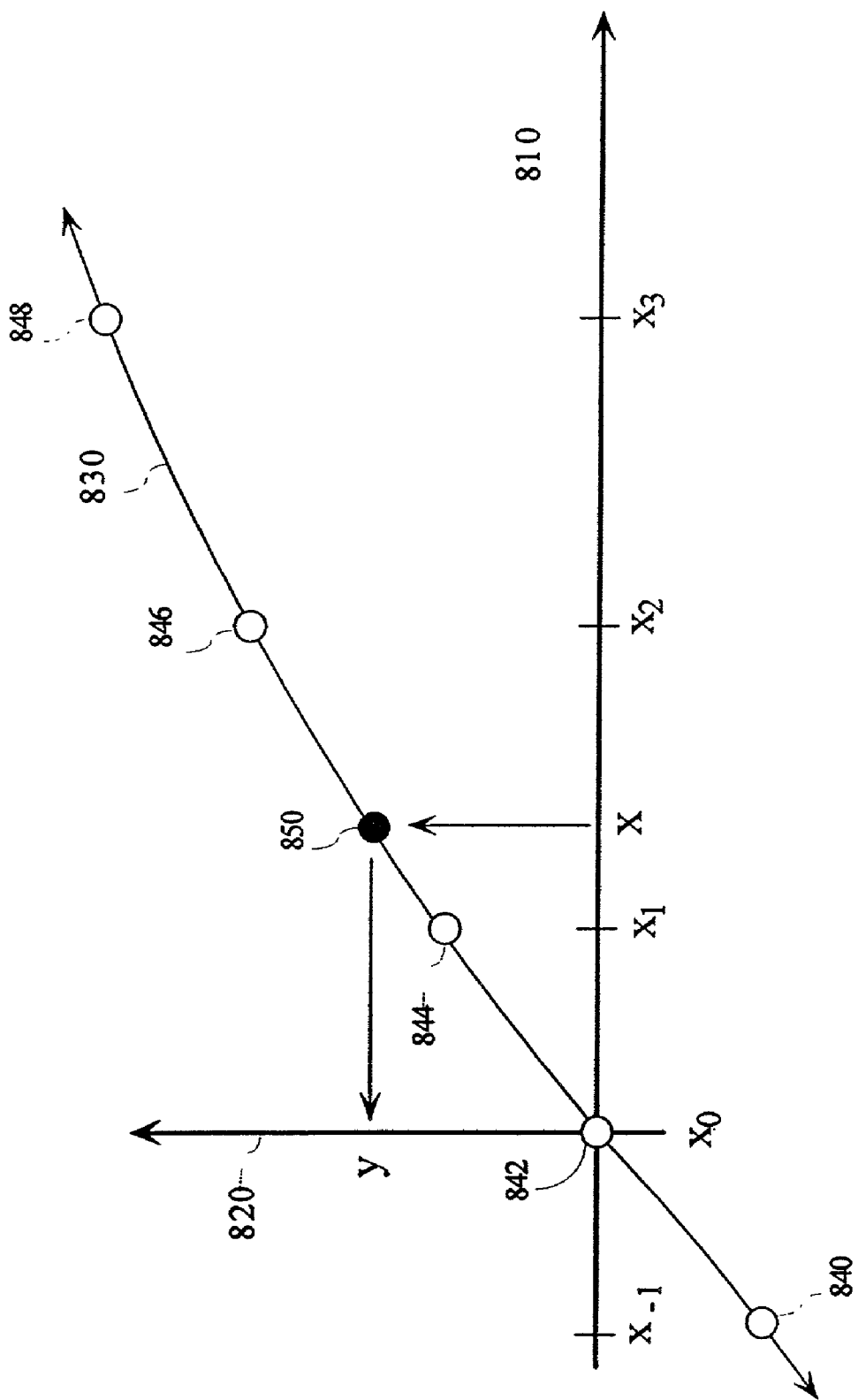
FIG. 8 depicts a cubic interpolation operation of a sine function according to the present invention.

FIG. 8 depicts a cubic-interpolation of a data-value 850 on a sine function 830 as expressed along a domain-axis 810 and against a respective range-axis 820. As shown in FIG. 8, the data-value 850, located at [x, y], can be accurately determined using the surrounding data-values 840–848 found along domain-values $\{x_0 ... x_3\}$. As discussed above, a Lagrange operation outlined by Eqs. (10)–(14) can be employed to interpolate data-value 850, and by pre-computing the denominator-value $c_0$, $c_1$, $c_2$ and $C_3$ according to Eq. (14), processing can be made more efficient. Still further, assuming that each reference point along domain-values $\{x_0 ... x_3\}$ is equally spaced, $c_n$ can be a constant for all denominator-values.

Figure 9:
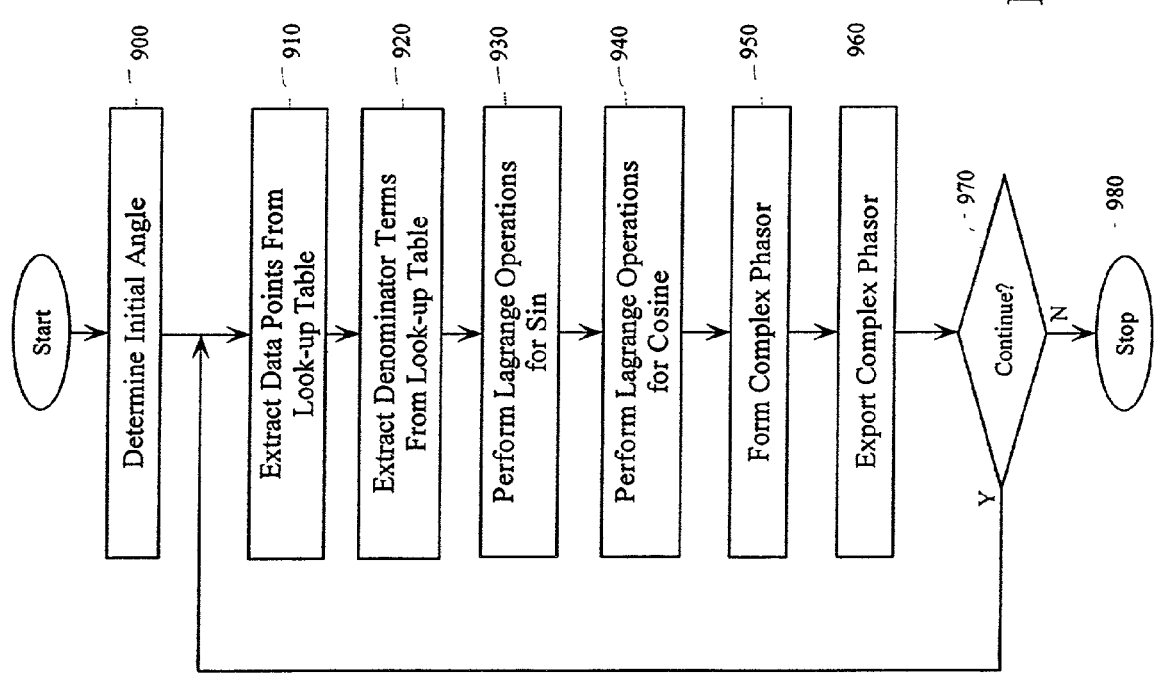
FIG. 9 is a flowchart outlining a second exemplary operation for generating a complex phasor according to the present invention.

FIG. 9 is a flowchart outlining an exemplary second operation according to the present invention. As shown in FIG. 9, the process starts at step 900 where an initial phase angle (domain value) x is determined. Next, in step 910, a set of respective data-values $[x_n, y_n]$ are extracted from a look-up table, such as the look-up table of FIG. 5. As discussed above, a look-up table may span the entire viable domain of a function or a look-up table may span a portion of a function's domain if the respective data-values can be determined from the provided domain portion. Control continues to step 920.

In step 920 a respective number of pre-computed inverse-denominator-values $c_n$ corresponding to data-values $[x_n, y_n]$ can be extracted from a look-up table. As discussed above, the inverse-denominator-values $c_n$ can be unique, or in a situation where the domain-values $x_n$ are equally spaced, $c_n$ can be constant for all domain-values $x_n$. Control continues to step 930.

In step 930, a Lagrange interpolation according to Eqs. (10)–(14) for a sine function is performed. Next, in step 940, a Lagrange interpolation according to Eqs. (10)–(14) for a cosine function is performed. Then, in step 950, the values produced in steps 930 and 940 can be combined to form a complex phasor. Control continues to step 960.

In step 960, the complex phasor of step 950 is exported to a device, such as a modulator in a communication device that can generate a communication signal using the sinusoid. Next, in step 970, a determination is made whether to continue to generate the complex phasor. If the complex phasor is to be further generated, control jumps back to step 910; otherwise, control continues to step 980 where the process stops.

It should be appreciated that the various above-described systems and methods are preferably implemented on a digital signal processor (DSP) or other integrated circuits However, the systems and methods can also be implemented using any combination of one or more general purpose computers, special purpose computers, programmable microprocessors or microcontrollers and peripheral integrated circuit elements, hardware electronic or logic circuits, such as application specific integrated circuits (ASICs), discrete element circuits, programmable logic devices, such as a PLD, PLA, FPGA, or PAL or the like. In general, any device on which exists a finite state machine capable of implementing the various elements of FIGS. 1–3 and 5–7 and/or the flowcharts of FIGS. 4 and 8–9 can be used to implement the oscillator 240 functions.

It should further be noted that while the exemplary oscillator can be used as part of a modulator, the methods and systems of the oscillator can be applied to various other devices, such as a mixer/frequency shifter, a demodulator in a receiver and the like, without departing from the spirit and scope of the present invention.

In various embodiments where the above-described systems and/or methods are implemented using a programmable device, such as a computer-based system or programmable logic, it should be appreciated that the above-described systems and methods can be described by any of various known or later developed programming languages, such as "C", "C++", "FORTRAN", Pascal", "VHDL" and the like.

Accordingly, various storage media, such as magnetic computer disks, optical disks, electronic memories and the like, can be prepared that can contain information that can direct a device to implement the above-described systems and/or methods. Once an appropriately capable device has access to the information contained on the storage media, the storage media can provide the information to the device, thus enabling the device to perform the above-described systems and/or methods.

For example, if a computer disk containing the appropriate information, such as a source file, an object file, an executable file or the like, were provided to a DSP, the DSP could receive the information, appropriately configure itself and perform the functions of the various elements of FIGS. 1–3 and/or the flowchart of FIG. 4 to implement the oscillator 240 functions. That is, the DSP could receive various portions of information from the disk relating to different elements of the above-described systems and/or methods, implement the individual systems and/or methods and coordinate the functions of the individual systems and/or methods to generate a complex sinusoid.

In still other embodiments, rather than providing a fixed storage media, such as a magnetic-disk, information describing the above-described systems and methods can be provided using a communication system, such as a network or dedicated communication conduit. Accordingly, it should be appreciated that various programs, executable files or other information embodying the above-described systems and methods can be downloaded to a programmable device using any known or later developed communication technique.

While this invention has been described in conjunction with the specific embodiments thereof, it is evident that many alternatives, modifications, and variations will be apparent to those skilled in the art. Accordingly, preferred embodiments of the invention as set forth herein are intended to be illustrative, not limiting. There are changes that may be made without departing from the spirit and scope of the invention.

What is claimed is:

1. A method comprising:
generating an oscillating electronic signal;
storing in a memory a first phasor associated with said electronic signal and a second phasor generated by multiplying together the first phasor with a delta phasor associated with a cyclic rate of the electronic signal, the first phasor having a first real portion and a first imaginary portion, the second phasor having a second real portion and a second imaginary portion;
storing in the memory a first sum generated by adding the first imaginary portion to the first real portion;
generating an imaginary correction factor by scaling the first sum according to a first scaling factor;
correcting a magnitude error of the second phasor by adding the imaginary correction factor to the second imaginary portion of the second phasor; and
updating the electronic signal based, at least in part, on the corrected second phasor.

2. The method of claim 1, further comprising:
storing in the memory a first difference generated by subtracting the first imaginary portion from the first real portion;
scaling the first difference according to the first scaling factor to produce a real correction factor; and
further correcting the magnitude error of the second phasor by adding the real correction factor to the second real portion of the second phasor.

3. The method of claim 2, wherein the steps of scaling are performed using a shift operation of N+P bits, where N is a target bit-precision and P is a non-zero integer such that $$2^{-P} \approx \left( \frac{1.0 - (\cos^2(\omega) + \sin^2(\omega))}{2} \right)$$

where $\omega$ is the frequency of the complex sinusoid.

4. The method of claim 3, wherein the first scaling factor is further based on a bit-precision of N bits, where N is a non-zero integer.

5. The method of claim 4, wherein the first correction factor is further based on a second correction factor, the second correction factor being based on a first term of a Taylor series relating to a square-root.

6. The method of claim 5, wherein the second scaling factor is based on the formula:

$$\alpha = \left( \frac{1.0 - (\cos^2(\omega) + \sin^2(\omega))}{2} \right)$$

where $\alpha$ is the second scaling factor and $\omega$ is the frequency of the complex sinusoid.

7. The method of claim 6, wherein the second correction factor is determined according to the formula $\alpha \approx 2^{-P}$, where P is a non-zero integer.

8. The method of claim 7, wherein the first scaling factor is equal to $2^{-(P+N)}$.

9. The method of claim 8, wherein the step of scaling is performed using a shift operation.

10. The method of claim 1, wherein the step of scaling is performed using a shift operation.

11. The method of claim 1, further comprising updating the electronic signal based on a third phasor produced a high-accuracy technique.

12. The method of claim 1, wherein the electronic signal is an electronic analog signal having sinusoidal form.

13. The method of claim 1, further comprising producing a communication signal based on the updated electronic signal.

14. The method of claim 1, further comprising receiving a communication signal using the updated electronic signal.

15. An apparatus for producing an electronic signal, comprising:
a multiplier that multiplies a first phasor associated with the electronic signal and a delta phasor associated with a cyclic rate of the electronic signal to produce a second phasor, the first phasor having a first real portion and a first imaginary portion, the second phasor having a second real portion and a second imaginary portion;
an arithmetic device that adds the first imaginary portion to the first real portion to produce a first sum;
a scaling device that scales the first sum according to a first scaling factor to produce an imaginary correction factor;
an adding device that adds the imaginary correction factor to the second imaginary portion of the second phasor to correct for a magnitude error of the second phasor; and
an interface that updates the electronic signal based on the corrected second phasor.

16. The method of claim 15, wherein the electronic signal is an electronic analog signal having sinusoidal form.

17. The apparatus of claim 16, wherein the second scaling factor is based on the formula:

$$\alpha = \left( \frac{1.0 - (\cos^2(\omega) + \sin^2(\omega))}{2} \right)$$

where $\alpha$ is the second scaling factor and $\omega$ is the frequency of the complex sinusoid.

18. The apparatus of claim 17, wherein the second correction factor is determined according to the formula $\alpha = 2^{-P}$, where P is a non-zero integer.

19. The apparatus of claim 18, wherein the scaling device scales the first sum device using a shift operation.

20. The method of claim 15, wherein the electronic signal is a communication signal having embedded information.

21. The apparatus of claim 15, wherein the arithmetic device further subtracts the first imaginary portion from the first real portion to produce a first difference, the scaling device further scales the first difference according to the first scaling factor to produce a real correction factor; and the adding device further adds the real correction factor to the second real portion of the second phasor to further correct for the magnitude error of the second phasor.

22. The apparatus of claim 15, wherein the first scaling factor is based on a bit-precision of N bits, where N is a non-zero integer.

23. The apparatus of claim 15, wherein the first correction factor is further based on a second correction factor, the second correction factor being based on a first term of a Taylor series.

24. The apparatus of claim 15, wherein the scaling device scales the first sum device using a shift operation.

25. The apparatus of claim 15, wherein the apparatus further updates the electronic signal based on a third phasor, the third phasor being produced a high-accuracy technique.

26. A machine-readable medium including instructions for producing an oscillating electronic signal, the instructions being arranged to cause a machine to perform the steps of:
multiplying a first phasor associated with the electronic signal and a delta phasor associated with a cyclic rate of the electronic signal to produce a second phasor, the first phasor having a first real portion and a first imaginary portion, the second phasor having a second real portion and a second imaginary portion;
adding the first imaginary portion to the first real portion to produce a first sum;
scaling the first sum according to a first scaling factor to produce an imaginary correction factor;
adding the imaginary correction factor to the second imaginary portion of the second phasor to correct for a magnitude error of the second phasor; and
updating the electronic signal based at least in part, on the corrected second complex sinusoid phasor.

27. The machine-readable medium of claim 26, further comprising instructions being arranged to cause a machine to perform the steps of:
subtracting the first imaginary portion from the first real portion to produce a first difference;
scaling the first difference according to the first scaling factor to produce a real correction factor; and
adding the real correction factor to the second real portion of the second phasor to further correct for the magnitude error of the second phasor.

28. The machine-readable medium of claim 27, wherein the steps of scaling are performed using a shift operation of N+P bits, where N is a target bit-precision and P is a non-zero integer such that $$2^{-P} \approx \left( \frac{1.0 - (\cos^2(\omega) + \sin^2(\omega))}{2} \right)$$

where ω is the frequency of the complex sinusoid.

29. An apparatus for producing an electronic signal, comprising:
a multiplying means for multiplying a first phasor associated with the electronic signal and a delta phasor associated with a cyclic rate of the electronic signal to produce a second phasor, the first phasor having a first real portion and a first imaginary portion, the second phasor having a second real portion and a second imaginary portion;
an arithmetic means for adding the first imaginary portion to the first real portion to produce a first sum;
a scaling means for scaling the first sum according to a first scaling factor to produce an imaginary correction factor;
an adding means for adding the imaginary correction factor to the second imaginary portion of the second phasor to correct for a magnitude error of the second phasor;
an interface that updates the electronic signal based on the corrected second phasor.

30. The apparatus of claim 29, wherein the arithmetic means further subtracts the first imaginary portion from the first real portion to produce a first difference, the scaling means further scales the first difference according to the first scaling factor to produce a real correction factor; and the adding means further adds the real correction factor to the second real portion of the second phasor to further correct for the magnitude error of the second phasor.

31. The apparatus of claim 29, wherein the scaling means performs its scaling without using a multiply operation.

32. The apparatus of claim 29, wherein the scaling means performs its scaling using one or more shift operations.

33. The apparatus of claim 29, further comprising a communication-based device that produces a communication signal using the updated electronic signal.

34. The apparatus of claim 29, further comprising a communication-based device that receives a communication signal using the updated electronic signal.

35. A method, comprising:
generating an oscillating electronic signal;
multiplying a first phasor associated with said electronic signal and a delta phasor associated with a cyclic rate of the electronic signal to produce a second phasor;
adding a first correction factor to the second phasor to provide a corrected second phasor; and
updating the electronic signal based at least in part on the corrected second phasor.

36. The method of claim 35, wherein the first phasor comprises a first real component and a first imaginary component, and the second phasor has a second real component and a second imaginary component.

37. The method of claim 36, wherein the first correction factor is substantially formed by adding the first imaginary portion to the first real portion to produce a first sum, and scaling the first sum according to a first scaling factor to produce the first correction factor.

38. The method of claim 37, wherein providing a corrected second phasor further comprises:
adding the first correction factor to the second imaginary portion of the second phasor to correct for a magnitude error of the second phasor.

39. The method of claim 37, further comprising:
subtracting the first imaginary portion from the first real portion to produce a first difference;
scaling the first difference according to the first scaling factor to produce a second correction factor; and
adding the second correction factor to the second real portion of the second phasor to further correct for the magnitude error of the second phasor.

40. The method of claim 39, wherein the first scaling factor is further based on a second scaling factor, the second scaling factor being based on a first term of a Taylor series relating to a square-root.

41. The method of claim 40, wherein the second scaling factor is based on the formula:

$$\alpha = \left( \frac{1.0 - (\cos^2(\omega) + \sin^2(\omega))}{2} \right)$$

where α is the second scaling factor and ω is the frequency of a complex sinusoid.

42. The method of claim 41, wherein the second scaling factor is determined according to the formula $\alpha \approx 2^{-P}$, where P is a non-zero integer.

43. The method of claim 37, wherein the first scaling factor is equal to $2^{-(P+N)}$.

44. The method of claim 39, wherein the scaling is performed using a shift operation.

45. The method of claim 35, further comprising updating the electronic signal based, at least in part, on a third phasor.

46. The method of claim 35, further comprising producing a communication signal based on the updated electronic signal.

47. The method of claim 39, wherein the scaling comprises shifting a binary representation of a first sum of N+P bits, where N is a target bit-precision and P is a non-zero integer such that $$2^{-P} \approx \left( \frac{1.0 - (\cos^2(\omega) + \sin^2(\omega))}{2} \right)$$

where α is the frequency of a complex sinusoid.

48. A system, comprising:
circuitry to combine a first phasor associated with an electronic signal and a delta phasor associated with a cyclic rate of the electronic signal to produce a second phasor;
circuitry to produce a correction factor;
circuitry to add the correction factor to the second phasor to correct for a magnitude error of the second phasor; and
circuitry to update the electronic signal based, at feast in part, on the corrected second phasor.

49. The system of claim 48, wherein the first phasor comprises a first real component and a first imaginary component, the second phasor comprises a second real component and a second imaginary component.

50. The system of claim 48, wherein the electronic signal is a communication signal.

51. The system of claim 49, and further comprising circuitry to subtract the first imaginary component from the first real component to produce a first difference;
scale the first difference according to a first scaling factor to produce a real correction factor and
add the real correction factor to the second real portion of the second phasor to correct for the magnitude error of the second phasor.

52. The system of claim 51, wherein the first scaling factor is based, at least in part, on a bit-precision of N bits, where N is a non-zero integer.

53. The system of claim 51, wherein the first scaling factor is further based, at least in part, on a second scaling factor, the second scaling factor being based on a first term of a Taylor series.

54. The system of claim 53, wherein the second scaling factor is based at least in part on the formula:

$$\alpha = \left( \frac{1.0 - (\cos^2(\omega) + \sin^2(\omega))}{2} \right)$$

where α is the second scaling factor and ω is the frequency of the complex sinusoid.

55. The system of claim 53, wherein the second scaling factor is determined according to the formula $\alpha=2^{-P}$, where P is a non-zero integer.

56. The system of claim 48, and further comprising circuitry to update the electronic signal based at least in part on a third phasor.

57. An article comprising: a storage medium having stored thereon instructions that if executed by a computing device performs a method as follows:
combining a first phasor associated with an oscillating electronic signal and a delta phasor associated with a cyclic rate of the electronic signal to produce a second phasor;
combing a first correction factor with the second phasor to provide a corrected second phasor; and
updating the electronic signal based at least in part on the corrected second phasor.

58. The article of claim 57, wherein the first phasor comprises a first real component and a first imaginary component, and the second phasor has a second real component and a second imaginary component.

59. The method of claim 58, wherein the instructions, if further executed, produce a correction factor as follows:
adding the first imaginary portion to the first real portion to produce a first sum; scaling the first sum according to a first scaling factor to produce a first correction factor;
adding the first correction factor to the second imaginary portion of the second phasor to correct for a magnitude error of the second phasor.

60. The method of claim 59, wherein the instructions, if further executed, perform a method comprising:
subtracting the first imaginary portion from the first real portion to produce a first difference;
scaling the first difference according to the first scaling factor to produce a second correction factor; and
adding the second correction factor to the second real portion of the second phasor to further correct for the magnitude error of the second phasor.

61. The article of claim 60, wherein the first scaling factor is further based on a second scaling factor, the second scaling factor being based on a first term of a Taylor series relating to a square-root.

62. The article of claim 61, wherein the second scaling factor is based on the formula:

$$\alpha = \left( \frac{1.0 - (\cos^2(\omega) + \sin^2(\omega))}{2} \right)$$

where α is the second scaling factor and ω is the frequency of a complex sinusoid.

63. The article of claim 61, wherein the second scaling factor is determined according to the formula $\alpha \approx 2^{-P}$, where P is a non-zero integer.

64. The article of claim 59, wherein the first scaling factor is equal to $2^{-(P+N)}$.

65. The article of claim 59, wherein the scaling is performed using a shift operation of
N+P bits, where N is a target bit-precision and P is a non-zero Integer such that $$2^{-P} \approx \left( \frac{1.0 - (\cos^2(\omega) + \sin^2(\omega))}{2} \right)$$

where ω is the frequency of a complex sinusoid.

* * * * *

UNITED STATES PATENT AND TRADEMARK OFFICE
CERTIFICATE OF CORRECTION

PATENT NO. : 7,240,083 B1  Page 1 of 1
APPLICATION NO. : 09/966103
DATED : July 3, 2007
INVENTOR(S) : G. Thiagarajan It is certified that error appears in the above-identified patent and that said Letters Patent is hereby corrected as shown below:

At column 11, line 6, Claim 1, after "method" insert -- , --.

At column 11, line 44, Claim 4, delete "3," and insert -- 1, --.

At column 11, line 45, Claim 4, before "based" delete "further".

At column 11, line 47, Claim 5, delete "correction" and insert -- scaling --.

At column 11, line 48, Claim 5, delete "correction" and insert -- scaling --.

At column 11, line 49, Claim 5, delete "correction" and insert -- scaling --.

At column 11, line 61, Claim 7, delete "correction" and insert -- scaling --.

At column 12, line 44, Claim 18, delete "correction" and insert -- scaling --.

At column 12, line 62, Claim 23, delete "correction" and insert -- scaling --.

At column 12, line 63, Claim 23, delete "correction" and insert -- scaling --.

At column 12, line 64, Claim 23, delete "correction" and insert -- scaling --.

At column 15, line 16, Claim 47, Claim 47, delete "$\alpha$" and insert -- $\omega$ --.

At column 15, line 26, Claim 48, delete "feast" and insert -- least --.

At column 15, line 26, Claim 48, delete "feast" and insert -- least --.

At column 15, line 38, Claim 51, delete "factor and" and insert -- factor; and --.

At column 16, line 8, Claim 57, delete "combing" and insert -- combining --.

Signed and Sealed this

Twenty-third Day of November, 2010

David J. Kappos
*Director of the United States Patent and Trademark Office*